United States Patent
Kong et al.

(10) Patent No.: US 9,207,779 B2
(45) Date of Patent: Dec. 8, 2015

(54) METHOD OF RECOGNIZING CONTACTLESS USER INTERFACE MOTION AND SYSTEM THERE-OF

(71) Applicant: SAMSUNG ELECTRONICS CO., LTD., Suwon-si (KR)

(72) Inventors: Myoung Seok Kong, Hwaseong-si (KR); Hyun Woo Park, Hwaseong-si (KR); Taek Kyun Shin, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 14/030,099

(22) Filed: Sep. 18, 2013

(65) Prior Publication Data

US 2014/0078048 A1 Mar. 20, 2014

(30) Foreign Application Priority Data

Sep. 18, 2012 (KR) .................. 10-2012-0103508

(51) Int. Cl.
*G06F 3/03* (2006.01)
*G06F 3/01* (2006.01)

(52) U.S. Cl.
CPC .............. *G06F 3/0304* (2013.01); *G06F 3/011* (2013.01); *G06F 3/0325* (2013.01)

(58) Field of Classification Search
CPC ..... G03F 3/011; G03F 3/0304; G03F 3/0325; H04N 13/0022; H04N 13/0239; H04N 13/026; H04N 13/0264; H04N 13/0271; H04N 2013/0081; H04N 2013/0085; G06T 7/0065

USPC .............................. 345/156; 348/E13.064, 51
See application file for complete search history.

(56) References Cited

U.S. PATENT DOCUMENTS

| | | | |
|---|---|---|---|
| 7,653,883 B2 | 1/2010 | Hotelling et al. | |
| 7,893,920 B2* | 2/2011 | Endoh | 345/156 |
| 2001/0014171 A1* | 8/2001 | Iijima et al. | 382/154 |
| 2011/0018976 A1* | 1/2011 | Park | 348/51 |
| 2011/0109577 A1 | 5/2011 | Lee et al. | |
| 2011/0141244 A1* | 6/2011 | Vos et al. | 348/51 |
| 2011/0154201 A1 | 6/2011 | Nakanishi | |
| 2012/0019524 A1* | 1/2012 | Nobori | 345/419 |
| 2012/0327077 A1* | 12/2012 | Tung | 345/419 |

(Continued)

FOREIGN PATENT DOCUMENTS

| | | |
|---|---|---|
| JP | 2009258884 A | 11/2009 |
| JP | 20112292 A | 1/2011 |

(Continued)

*Primary Examiner* — Tom Sheng
(74) *Attorney, Agent, or Firm* — Sughrue Mion, PLLC

(57) ABSTRACT

A contactless user-interface (UI) motion recognizing device and method of controlling the same are provided. The method includes: obtaining a left-eye image and a right-eye image; determining an object position of an object in the obtained left-eye image and the obtained right-eye image; determining an object brightness of the object; determining depth information of the object using the determined object brightness; determining a three-dimensional (3D) object position of the object using the determined object position and the determined depth information; determining an object moving velocity based on the determined 3D object position and a previous 3D object position; and determining a UI pattern based on the determined 3D object position and the determined object moving velocity, and executing an operation according to the determined UI pattern.

19 Claims, 14 Drawing Sheets

(56) References Cited

U.S. PATENT DOCUMENTS

| | | | |
|---|---|---|---|
| 2013/0076876 A1* | 3/2013 | Shimotani et al. | 348/51 |
| 2013/0100123 A1* | 4/2013 | Hakoda et al. | 345/419 |
| 2013/0329015 A1* | 12/2013 | Pulli et al. | 348/47 |
| 2014/0354702 A1* | 12/2014 | Choi et al. | 345/690 |

FOREIGN PATENT DOCUMENTS

| | | |
|---|---|---|
| KR | 100446236 B1 | 8/2004 |
| KR | 1020070062881 A | 6/2007 |
| KR | 1020090079019 A | 7/2009 |
| KR | 1020110037053 A | 4/2011 |

* cited by examiner

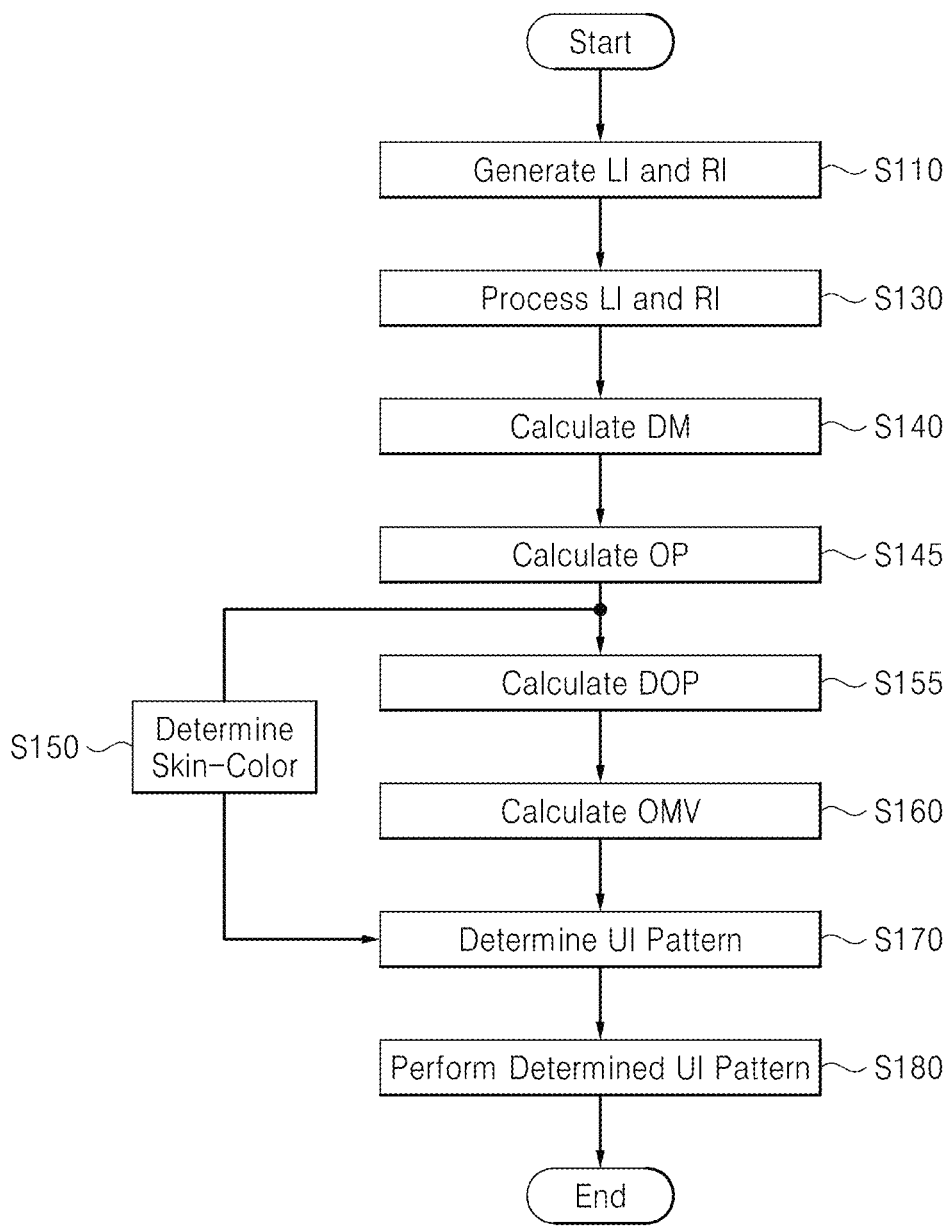

METHOD OF RECOGNIZING CONTACTLESS USER INTERFACE MOTION AND SYSTEM THERE-OF

CROSS-REFERENCE TO RELATED APPLICATION

This application claims priority from Korean Patent Application No. 10-2012-0103508, filed Sep. 18, 2012 in the Korean Intellectual Property Office, the entire contents of which are hereby incorporated by reference.

BACKGROUND

1. Field

Apparatuses and methods consistent with exemplary embodiments relate to an electronic device having a stereo camera, and more particularly, a mobile device having a stereo camera.

2. Description of the Related Art

With the development of mobile devices, studies for user interface recognition and its processing methods in the mobile devices are growing.

Most of the mobile devices adopt touch screen user interfaces. The touch screen user interface enables a user to interact directly with what is displayed because the touch screen user interface can detect the presence and location of a touch within a display area.

But as the touch screen user interface is operating in a two-dimensional area, the touch screen user interface is limited in supporting various types of user interfaces. Also, as a user should touch a screen to operate the mobile devices, such a touch screen provides inconveniences when the user is in a condition where the user is unable to touch the screen easily.

SUMMARY

Exemplary embodiments overcome the above disadvantages and other disadvantages not described above. Also, an exemplary embodiment is not required to overcome the disadvantages described above, and an exemplary embodiment may not overcome any of the problems described above According to an aspect of the an exemplary embodiment, there is provided a method of controlling a contactless user-interface (UI) motion recognizing device, the method including: obtaining a left-eye image and a right-eye image; determining an object position of an object in the obtained left-eye image and the obtained right-eye image; determining an object brightness of the object; determining depth information of the object using the determined object brightness; determining a three-dimensional (3D) object position of the object using the determined object position and the determined depth information; determining an object moving velocity based on the determined 3D object position and a previous 3D object position; and determining a UI pattern based on the determined 3D object position and the determined object moving velocity, and executing an operation according to the determined UI pattern.

According to an aspect of the another exemplary embodiment, there is provided a method of controlling a contactless user-interface (UI) motion recognizing device, the method including: obtaining a left-eye image and a right-eye image; determining an object position of an object in the obtained left-eye image and the obtained right-eye image; determining an object brightness of the object; determining depth information of the object using the determined object brightness; determining a three-dimensional (3D) object position of the object using the determined object position and the determined depth information; and determining a UI pattern based on the determined 3D object position and executing an operation according to the determined UI pattern.

According to an aspect of the another exemplary embodiment, there is provided a contactless user-interface (UI) motion recognizing device, including: a position and brightness calculator which determines an object position of an object in an obtained left-eye image and an obtained right-eye image, and determines an object brightness of the object; a depth converter which determines depth information of the object using the determined object brightness, and determines a three-dimensional (3D) object position of the object using the determined object position and the determined depth information; and a pattern detector which determines a UI pattern based on the determined 3D object position and executes an operation according to the determined UI pattern.

BRIEF DESCRIPTION OF THE FIGURES

The above and other aspects will become apparent from the following description with reference to the following figures, wherein like reference numerals refer to like parts throughout the various figures unless otherwise specified, and wherein:

FIG. 4 is a flowchart illustrating an operation of the contactless UI motion recognition device 110A illustrated in FIG. 2.

DETAILED DESCRIPTION OF EXEMPLARY EMBODIMENTS

Figure 1:
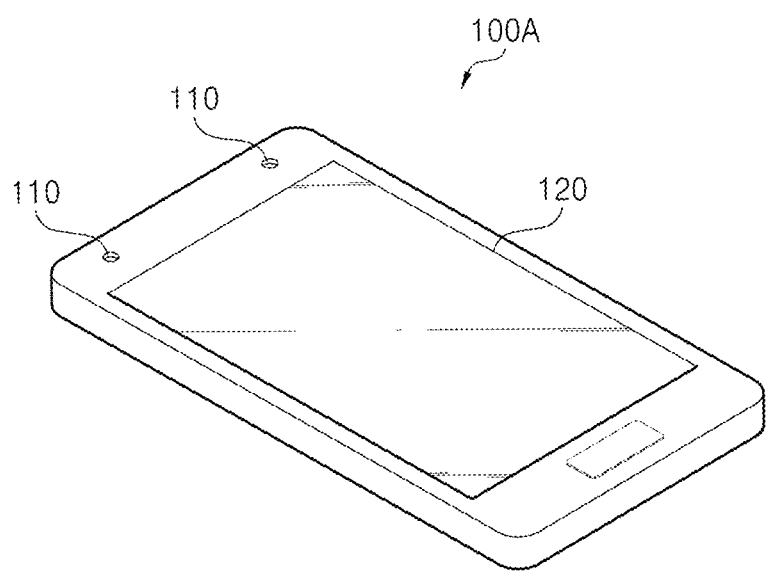
FIG. 1 is a contactless user-interface (UI) motion recognizing device according to an exemplary embodiment.

Exemplary embodiments will be described in detail with reference to the accompanying drawings. Exemplary embodiments, however, may be embodied in various different forms, and should not be construed as being limited only to the illustrated exemplary embodiments. Rather, these exemplary embodiments are provided as examples so that this disclosure will be thorough and complete, and will fully convey the concepts of the disclosure to those skilled in the art. Accordingly, known processes, elements, and techniques are not described with respect to some of the exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first," "second," "third," etc., may be used herein to describe various elements, components, regions, layers, and/or sections, these elements, components, regions, layers, and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular exemplary embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a contactless user-interface (UI) motion recognizing device 100A according to an exemplary embodiment. A contactless UI motion recognizing device 100A can be a mobile device, a smart phone, a personal digital assistant (PDA), a digital camera, a mobile device having a camera, a portable multimedia player (PMP), a notebook computer, and a tablet personal computer. However, it is understood that the contactless UI motion recognizing device 100A should not be construed as being limited to the devices described above. Referring to FIG. 1, the contactless UI motion recognizing device 100A includes a stereo camera 110 and a screen 120. The stereo camera 110 can capture three-dimensional images. Furthermore, in the present exemplary embodiment, the stereo camera 110 has two sensors, a left sensor corresponding to a left eye and a right sensor corresponding to a right eye. The stereo camera 110 may recognize movement of a user by capturing at least one motion of up-and-down, right-and-left and forward-and-backward of a finger of the user. While exemplary embodiments disclosed herein are with reference to a stereo camera 110 with two lenses corresponding to two eyes, it is understood that one or more other exemplary embodiments are not limited thereto, and are applicable to single-lens stereo cameras, or to devices which apply a related art algorithm to convert a two-dimensional image into a three-dimensional image.

Figure 2:
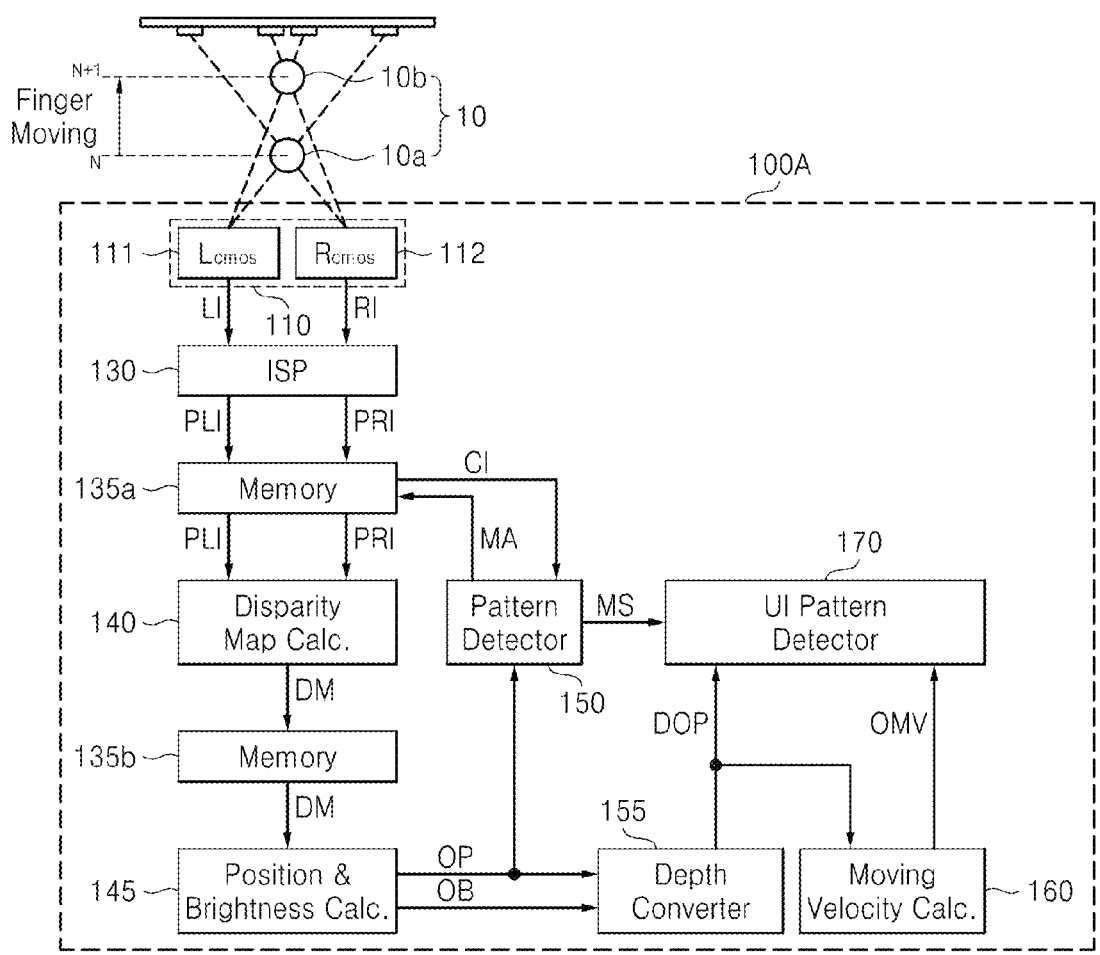
FIG. 2 is a block diagram schematically illustrating a contactless UI motion recognizing device according to an exemplary embodiment.
Figure 3A:
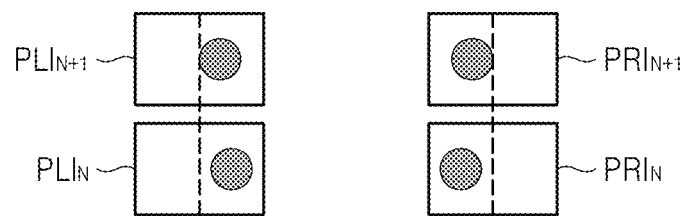
FIGS. 3A and 3B are diagrams illustrating a change of position and brightness of an object according to an exemplary embodiment.
Figure 3B:
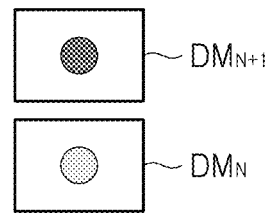

FIG. 2 is a block diagram schematically illustrating the contactless UI motion recognizing device 100A according to an exemplary embodiment. Furthermore, FIG. 3A shows images captured by the two sensors in the contactless UI motion recognizing device 100A as the finger moves. FIG. 3B is a disparity mapping calculated based on the captured two images.

Referring to FIGS. 2, 3A, and 3B, the contactless user UI motion recognizing device 100A includes the stereo camera 110, an image signal processor (ISP) 130, a memory 135$a$/135$b$ (e.g., a first memory 135$a$ and a second memory 135$b$), a disparity map calculator 140, a position and brightness calculator 145, a depth converter 155, a pattern detector 150, a moving velocity calculator 160, and a UI pattern detector 170. The stereo camera 110 has a left image sensor 111 that corresponds to a left eye and a right image sensor 112 that corresponds to a right eye.

The two image sensors 111/112 capture two-dimensional or three-dimensional images. The two image sensors 111/112 generate images using, e.g., a photoelectric conversion device which reacts based on strengths of reflected light from an object 10. The left image sensor 111 generates a left image (LI) and the right image sensor 112 generates a right image (RI). The two image sensors 111/112 (e.g., first image sensor 111 and second image sensor 112) can be embodied as a Complementary Metal-Oxide Semiconductor (CMOS) image sensor but should not be construed as limited to this.

The ISP 130 receives the LI and the RI, processes the LI and the RI, and generates a processed left image (PLI) and a processed right image (PRI) based on the LI and the RI. For example, the ISP 130 may perform an interpolation, an adjustment of brightness and contrast, a quantization, a color conversion, an image composition, an image registration, etc.

Furthermore, the PLI and the PRI are stored in the memory 135a after being processed by the ISP 130 and the PLI and the PRI are transmitted to the disparity map calculator 140. The disparity map calculator 140 calculates a disparity between the PLI and the PRI through an image matching (e.g., block matching) between the PLI and the PRI. Based on a result of the calculating, the disparity map calculator 140 converts the disparity to brightness information and creates a disparity map (DM) based on the brightness information. The DM may be stored in the memory 135b. The memory 135a and the memory 135 can be the same memory or different memories, and may be realized as a non-volatile memory.

The greater the calculated disparity is, the closer a distance between the camera 110 and the object 10, and the less the calculated disparity is, the further the distance between the camera 110 and the object 10. In other words, the calculated disparity increases the closer the object 10 is to the camera 110, and the calculated disparity decreases the further the object 10 is from the camera 100. Thus, a disparity can be calculated by matching the LI and the RI, and a distance from the camera 110 to an object 10 can be calculated based on the calculated disparity.

Referring to FIG. 2, it is assumed that the object 10 is moving from a location 10a to a location 10b. As illustrated in FIG. 3A, a disparity between a left finger image ($PLI_N$) and a right finger image ($PRI_N$) when the object 10 is located at location 10a is larger than a disparity between a left finger image ($PLI_{N+1}$) and a right finger image ($PRI_{N+1}$) when the object 10 is located further from the camera 110, i.e., at location 10b. Accordingly, as illustrated in FIG. 3B, a disparity map ($DM_N$) at location 10(a) is brighter than a disparity map ($DM_{N+1}$) at location 10(b).

The position and brightness calculator 145 may sense an end part of an object 10 (e.g., a finger) and may calculate a location of the end part of the object. The end part of the object 10 may be the brightness part in a DM. For example, the closest part of the object 10 from the camera 110 is the brightest part in the DM. Accordingly, an X-Y object position (OP) and an object brightness (OB) can be calculated based on the DM.

The depth converter 155 may calculate distance information based on an OB and generate a three-dimensional object position (DOP). In other words, the depth converter 155 may calculate the DOP using the OP and the OB of the object 10. As the OB corresponds to a distance between the camera 110 and the object 10, the OB can be indicated by the DOP.

The pattern detector 150 may determine whether color of the object 10 is skin-color by reading color information (CI) corresponding to a pixel group of the OP from the memory 135a. In other words, the pattern detector 150 may determine whether the object 10 is a certain pre-defined object (e.g., a finger) so that the UI motion recognizing device 110A responds to a UI pattern only when the object 10 is the certain pre-defined object. The pattern detector 150 may provide a memory address (MA) to read a CI corresponding to the MA from the memory 135a.

According to another exemplary embodiment, the pattern detector 150 may be omitted or provided to detect another object 10. For example, according to another exemplary embodiment, the UI motion recognizing device 110A may respond to the UI pattern when the object 10 is other than a finger (e.g., a pencil, a stick, a stylus, etc.), and the pattern detector 150 may be omitted or provided differently.

The moving velocity calculator 160 may sense a moving velocity of the object 10 (OMV). The OMV may be used to determine whether a movement of the object 10 is meaningful or not (e.g., with reference to a predetermined threshold velocity). For example, in case the object 10 is moving back and forth rapidly from its original position, it may be interpreted that a user wants to click an icon displayed on a screen corresponding to a location of a finger of the user on the screen. However, if a moving velocity of the object is slow, it may be interpreted that the user does not try to click an icon displayed on a screen corresponding to a location of a finger of the user on the screen. Accordingly, when the OMV is more than or equal to a predetermined threshold velocity, a movement of the object 10 can be interpreted as a meaningful action.

The UI pattern detector 170 may recognize a UI pattern based on the DOP and the OMV. The UI pattern detector 170 can be embodied as a processor such as a central processing unit (CPU). In this case, the processor may determine a UI pattern by executing a UI pattern recognition algorithm or a UI pattern recognition program (e.g., stored on a computer-readable recording medium) and the processor may execute an operation corresponding to the UI pattern. For example, if a UI pattern is interpreted as clicking an icon displayed on a screen where a finger is pointed, an operation corresponding to the icon will be executed.

As illustrated above, one or more exemplary embodiments recognize a location of an object (e.g., a finger) and information of its movement using three-dimensional images from a stereo camera and recognize a UI pattern. Accordingly, one or more exemplary embodiments reduce an inconvenience and limitation of a related art two-dimensional touch screen method.

FIG. 4 is a flowchart illustrating an operation of the contactless UI motion recognition device 110A illustrated in FIG. 2.

Figure 5:
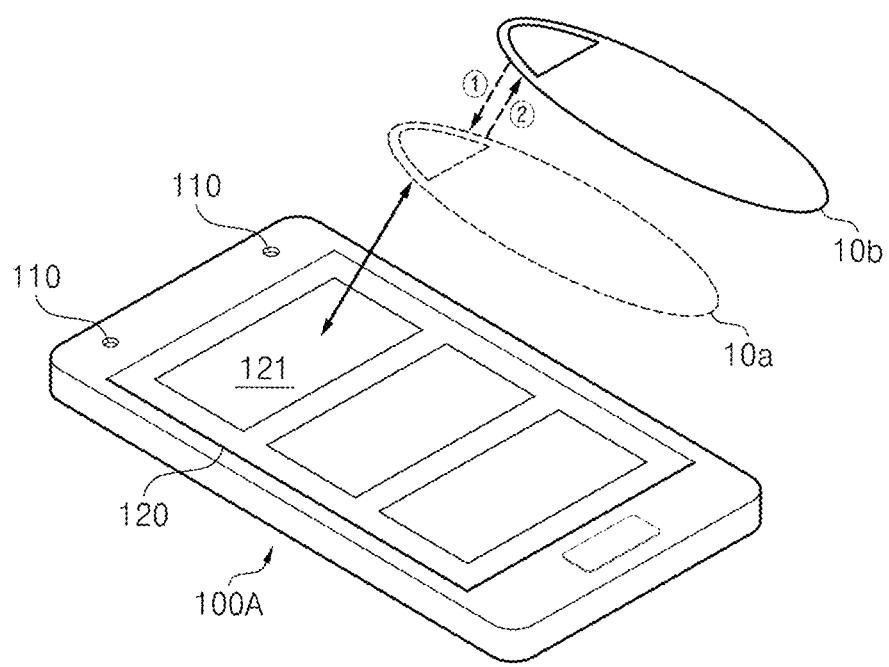
FIG. 5 is a diagram for illustrating a contactless UI motion according to an exemplary embodiment.
Figure 6:
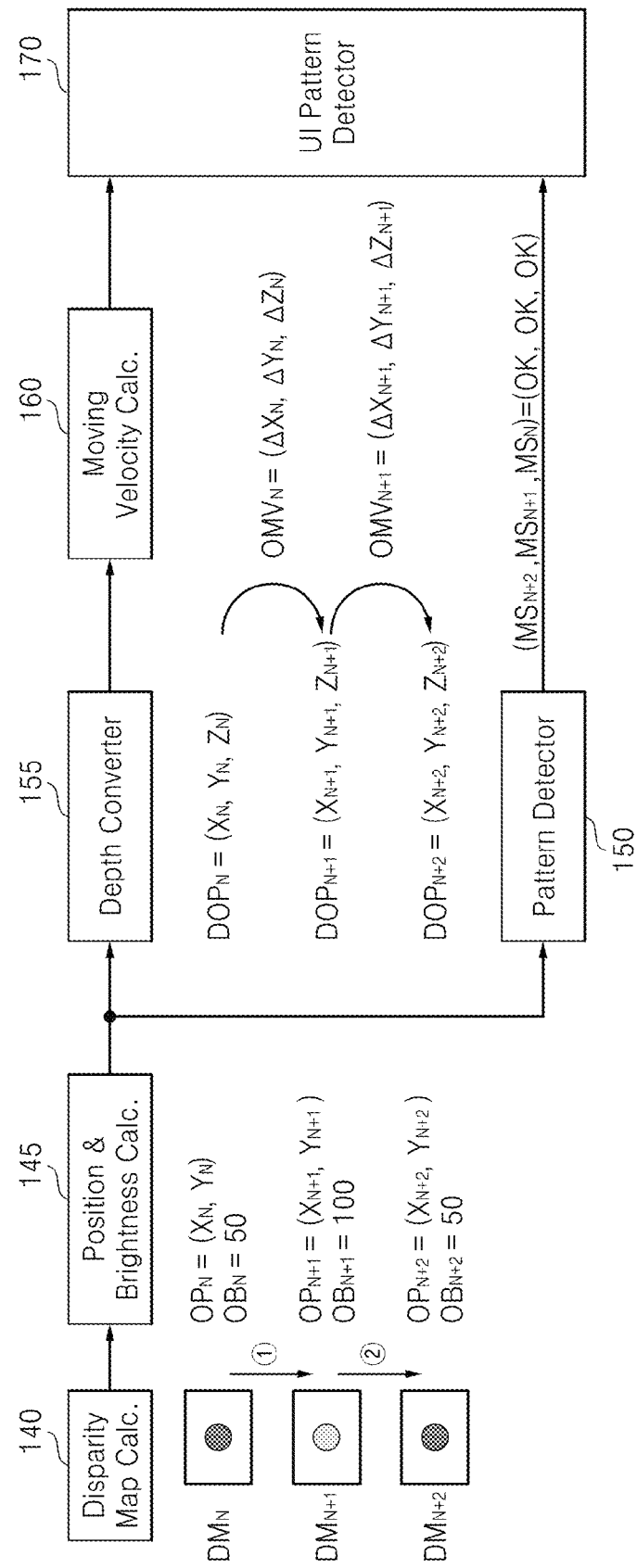
FIG. 6 is a block diagram for illustrating an operation of the contactless UI motion recognition device illustrated in FIG. 2, according to an exemplary embodiment.

FIG. 5 is a diagram illustrating a contactless UI motion according to an exemplary embodiment. FIG. 6 is a block diagram for illustrating an operation of the contactless UI motion recognition device 100A illustrated in FIG. 2 according to the contactless UI motion described with reference to FIG. 5.

Referring to FIGS. 2 through 6, the left image sensor 111 generates a LI and the right image sensor 112 generates a RI (operation S110). The ISP 130 processes the LI and RI, and generates a PLI and a PRI (operation S135a). The PLI and the PRI can be stored in the memory 135a.

The disparity map calculator 140 receives the PLI and the PRI from the memory 135a (or directly from the ISP 130 in another exemplary embodiment) and calculates a DM between the PLI and the PRI (operation S140). In this process, the DM may provide brightness information converted from a disparity between the PLI and the PRI.

As shown in FIG. 5, it is assumed that a first motion ① is a motion in which an object is moving from its original position toward a camera 110 and a second motion ② is a motion in which the object is returning to its original position.

The disparity map calculator 140 may calculate a $DM_N$ of an (N)th frame, a $DM_{N+1}$ of an (N+1)th frame, and a $DM_{N+2}$ of an (N+2)th frame and store the calculated DMs in the memory 135a. According to an exemplary embodiment illustrated in FIGS. 5 and 6, the $DM_N$ is a DM when the object is in its original position before moving, the $DM_{N+1}$ is a DM when the object is close to the camera 110 due to the first motion ①, and $DM_{N+2}$ is a DM when the object returns to its original position due to the second motion ②.

The position and brightness calculator 145 may sense an end of the object (e.g., a finger), calculate an OP (operation S145), and calculate an OB corresponding to the OP. For example, the position and brightness calculator 145 may calculate $OP_N(X_N, Y_N)$ and a value $OB_N=50$ corresponding to a finger location in the (N)th frame and saves the calculated OP and the calculated OB in the memory 135a, calculate $OP_{N+1}$ ($X_{N+1}$, $Y_{N+1}$) and a value $OB_{N+1}=100$ corresponding to the finger location in the (N+1)th frame and saves the calculated OP and the calculated OB in the memory 135a, and calculate $OP_{N+2}(X_{N+2}, Y_{N+2})$ and value $OB_{N+2}=50$ corresponding to the finger location in the (N+2)th frame and saves the calculated OP and the calculated OB in the memory 135a

The depth converter 155 calculates distance information Z of the finger (i.e., depth information) based on an OB, and calculates a DOP. For example, the depth converter 155 may convert a value of $OB_N=50$ corresponding to a finger location in the (N)th frame to distance information $Z_N$, convert a value of $OB_{N+1}=100$ corresponding to the finger location in the (N+1)th frame to distance information $Z_{N+1}$, and convert a value of $OB_{N+2}=50$ corresponding to the finger location in the (N+2)th frame to distance information $Z_{N+2}$. Through the above-described process, three dimensional coordinates ($DOP_N$, $DOP_{N+1}$, $DOP_{N+2}$) corresponding to locations of each frame (N, N+1, N+2) can be calculated (operation S155).

The pattern detector 150 may determine whether a color of the object is skin-color by a CI corresponding to a pixel group of the OP from the memory 135a (operation S150). For example, the pattern detector 150 reads the CI from the memory 135a corresponding to the location of the finger in the (N)th frame, determine where the color is skin-tone according to the read CI, and may generate a skin-tone matching signal $MS_N$ in case the color is the skin-tone. Likewise, the pattern detector 150 may generate a skin-tone matching signal $MS_{N+1}$ in case the color in the (N+1) the frame is skin-tone, and may generate a skin-tone matching signal $MS_{N+2}$ in case the color in the (N+2)th frame is skin-tone. If colors of the finger in the (N)th, the (N+1)th, and the (N+2)th frame are skin-tone, matching signals $MS_N$, $MS_{N+1}$, $MS_{N+2}$ are set to a signal value indicating that the color is skin-tone), and values of $MS_N$, $MS_{N+1}$, and $MS_{N+2}$ are sent to the UI pattern detector 170.

The moving velocity calculator 160 calculates an OMV based on the three-dimensional coordinates ($DOP_N$, $DOP_{N+1}$, $DOP_{N+2}$) (operation S160). For example, the moving velocity calculator 160 calculates a velocity between the (N)th frame and the (N+1)th frame $OMV_N$, and a velocity between the (N+1)th frame and the (N+2)th frame $OMV_{N+1}$ according to an exemplary Equation (1) as follows:

$$OMV_N = (X_{N+1}-X_N, Y_{N+1}-Y_N, Z_{N+1}-Z_N) = (\Delta X_N, \Delta Y_N, \Delta Z_N)$$

$$OMV_{N+1} = (X_{N+2}-X_{N+1}, Y_{N+2}-Y_{N+1}, Z_{N+2}-Z_{N+1}) = (\Delta X_{N+1}, \Delta Y_{N+1}, \Delta Z_{N+1})$$ [Equation 1]

The UI Pattern detector 170 may determine a UI pattern of a user based on the skin-tone matching signals ($MS_N$, $MS_{N+1}$, $MS_{N+2}$), the three dimensional coordinates ($DOP_N$, $DOP_{N+1}$, $DOP_{N+2}$) of the object, and velocity information between frames ($OMV_N$, $OMV_{N+1}$) (operation S170). In a case that any value of the matching signals ($MS_N$, $MS_{N+1}$, $MS_{N+2}$) does not correspond to a skin-tone color, the UI Pattern detector 170 may determine the UI pattern of the user does not correspond to the finger. If all the skin-tone matching signals ($MS_N$, $MS_{N+1}$, $MS_{N+2}$) indicate the skin-tone color, it may be interpreted that the UI pattern of the user is one of predetermined UI patterns.

Once the UI pattern is determined, an operation corresponding to the determined UI pattern is performed (operation S180). For example, in a case that the determined UI pattern corresponds to a clicking of an icon displayed on a screen, the click operation is executed.

Although the above-described exemplary embodiment determines the UI pattern based on three frames (N, N+1, and N+2), it is understand that one or more other exemplary embodiments are not limited thereto, and the UI pattern may be based on any number of frames. Additionally, while the above-described exemplary embodiment determines that the object corresponds to the finger when all skin-tone matching signals ($MS_N$, $MS_{N+1}$, $MS_{N+2}$) indicate the skin-tone color, it is understood that one or more other exemplary embodiments are not limited thereto, and any predetermined threshold percentage or number of skin-tone matching signals indicating the skin-tone color may be used for the determination.

Figure 7:
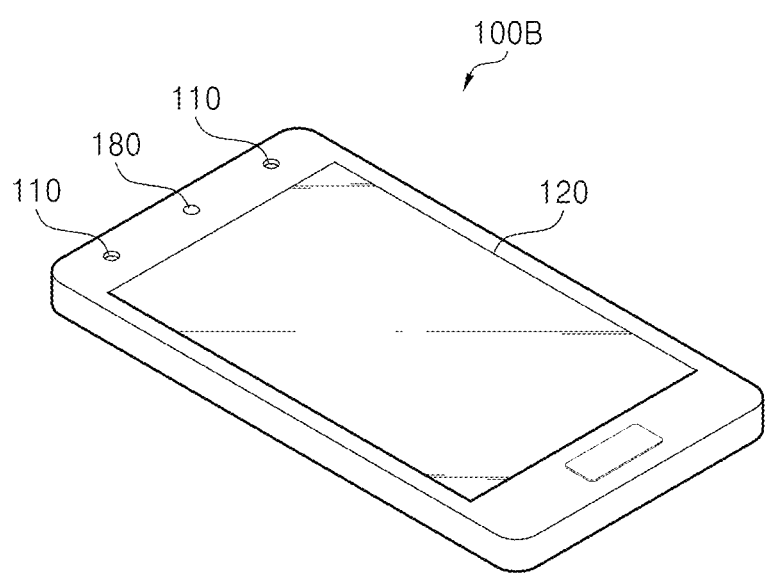
FIG. 7 is a diagram illustrating a contactless UI motion recognizing device according to another exemplary embodiment.

FIG. 7 is a diagram illustrating a contactless UI motion recognizing device 100B according to another exemplary embodiment. Referring to FIG. 7, as an operation of the contactless UI motion recognizing device 100B is the same as or similar to that of the contactless UI motion recognizing device 100A illustrated in FIG. 1, differences therebetween will be focused on herein to avoid redundancy.

The contactless UI motion recognizing device 100B may further include a temperature sensor 180 as compared to the contactless UI motion recognizing device 100A illustrated in FIG. 1. The temperature sensor 180 measures temperature of surroundings. The temperature and its related information measured by the temperature sensor 180 can be a factor to determine a UI pattern of a user.

Figure 8:
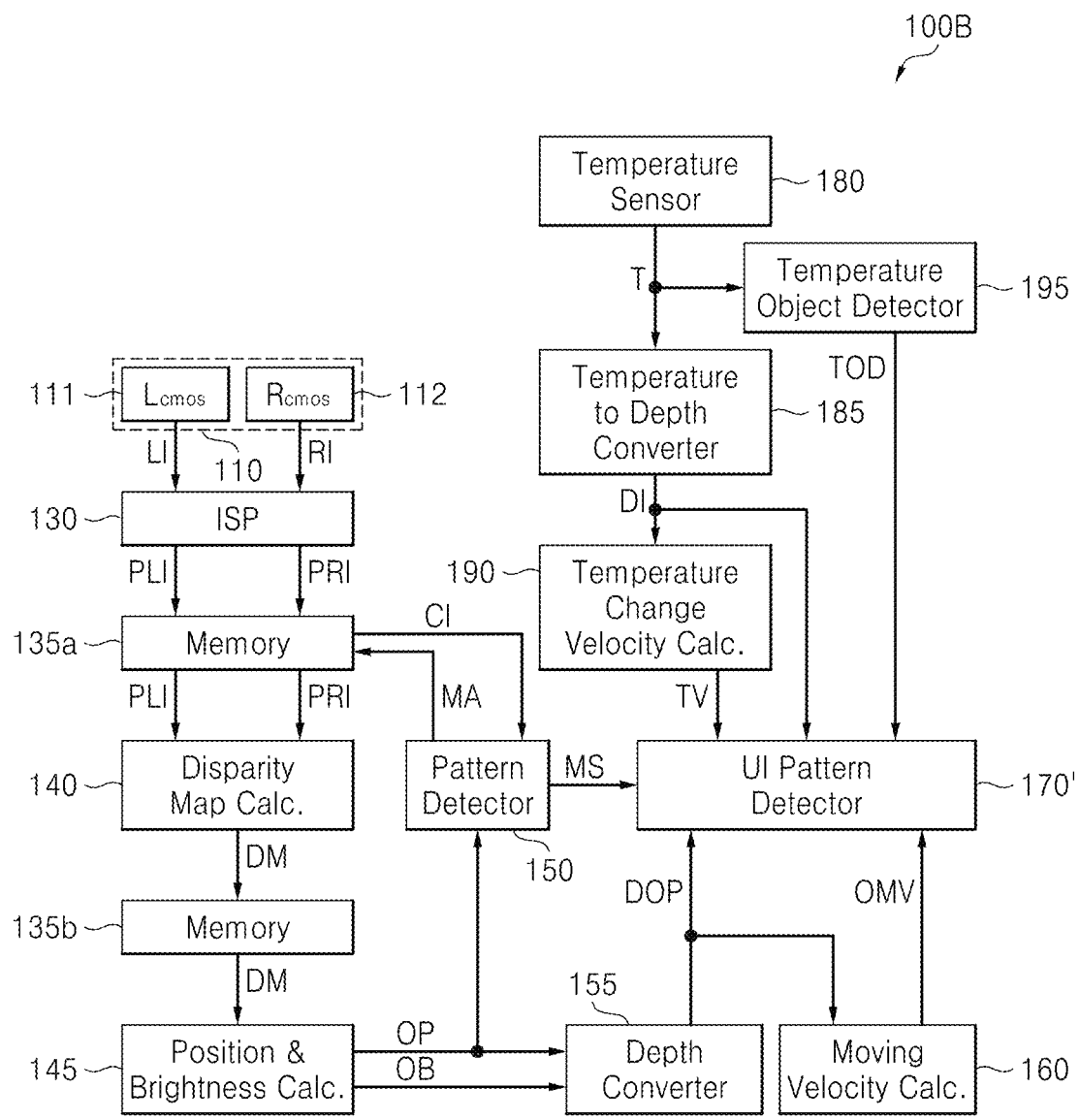
FIG. 8 is a block diagram illustrating a contactless UI motion recognizing according to another exemplary embodiment.

FIG. 8 is a block diagram illustrating the contactless UI motion recognizing 100B according to another exemplary embodiment. Referring to FIG. 8, the contactless UI motion recognizing device 100B may further include the temperature sensor 180, a temperature to depth converter 185, a temperature object detector 195, and a temperature change velocity calculator 190.

The temperature sensor 180 measures temperature of surroundings T. The temperature to depth converter 185 converts the measured temperature of surroundings T to depth information (DI). For example, in a case that an object is a finger, the temperature measured when the finger is far from the temperature sensor 180 is relatively lower than that of when the finger is close to the temperature sensor 180. Accordingly, the temperature to depth converter 185 can convert the temperate to the depth information.

The temperature object detector 190 may calculate variations of the depth information per hour and calculate a temperature-based velocity TV based on the depth information.

The temperature object detector 195 may determine whether there is an object (e.g., a finger) based on the temperature of surroundings. For example, the temperature object detector 195 determines whether the temperature of the surrounding is within a predetermined range, and if so, the temperature object detector 195 detects an object and generates a temperature object detection signal (TOD) accordingly.

The temperature object detector 195 may be omitted in another exemplary embodiment. For example, in a case that a contactless UI motion recognizing device is designed to respond to objects besides a finger, such as a pencil or a stylus, the temperature object detector 195 can be omitted. According to another exemplary embodiment, some of elements shown in FIG. 8 may be omitted or some elements not shown in FIG. 8 may be included.

The UI pattern detector 170' determines a UI pattern based on a three dimensional coordinate (DOP) and a velocity (OMV), one or more matching signals (MS), and depth information (DI) calculated based on temperature of surroundings, a temperate based velocity (TV), and a temperature object detection signal (TOD) of an object generated by images from a stereo camera 110.

The contactless UI motion recognizing device 100B executes an operation corresponding to the determined UI pattern determined by the UI pattern detector 170'. For example, if a UI pattern indicates an operation of clicking an icon displayed on a screen 120 where a finger pointed, the operation corresponding to the icon will be executed.

As described above, one or more exemplary embodiments recognize a UI pattern accurately by analyzing a location, velocity information, and a temperature of an object (e.g., a finger) based on images from a stereo camera 110.

Figure 9:
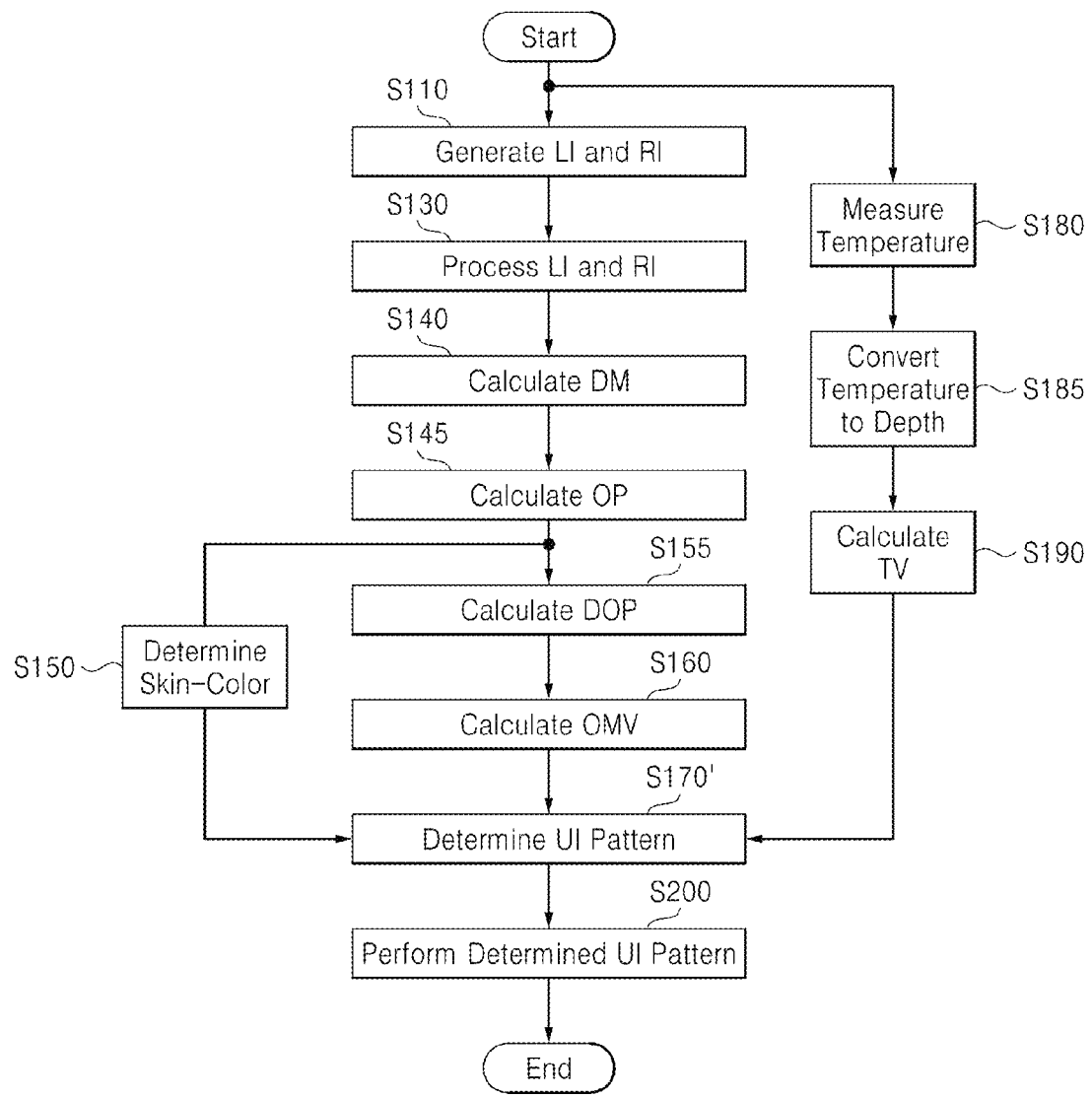
FIG. 9 is a flowchart illustrating an operation of a contactless UI motion recognizing device according to another exemplary embodiment.

FIG. 9 is a flowchart illustrating an operation of a contactless UI motion recognizing device 100B according to another exemplary embodiment. The operations in FIG. 9 may be performed by the contactless UI motion recognizing device 100B illustrated in FIG. 8.

Figure 10:
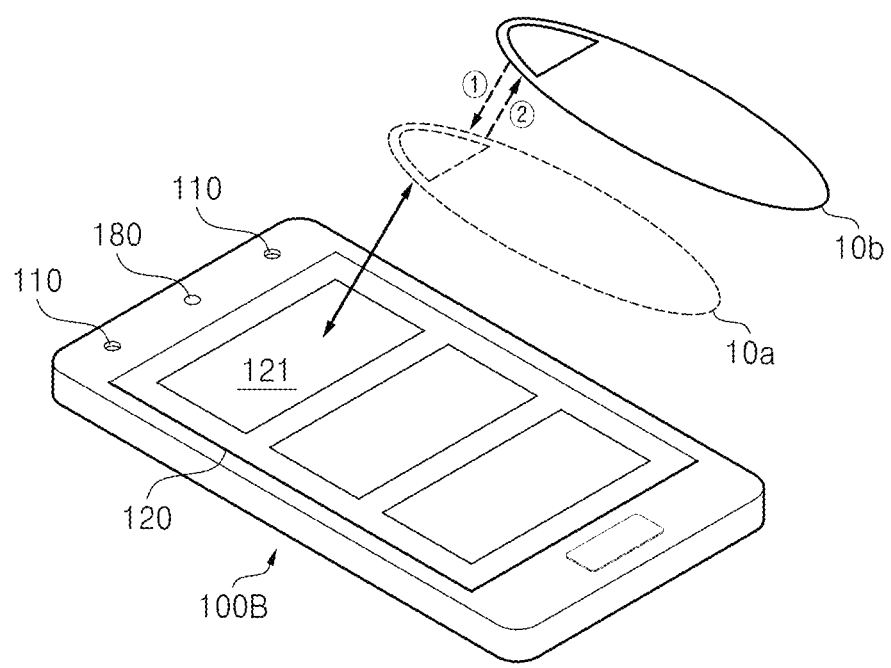
FIG. 10 is a diagram illustrating a contactless UI motion according to another exemplary embodiment.
Figure 11:
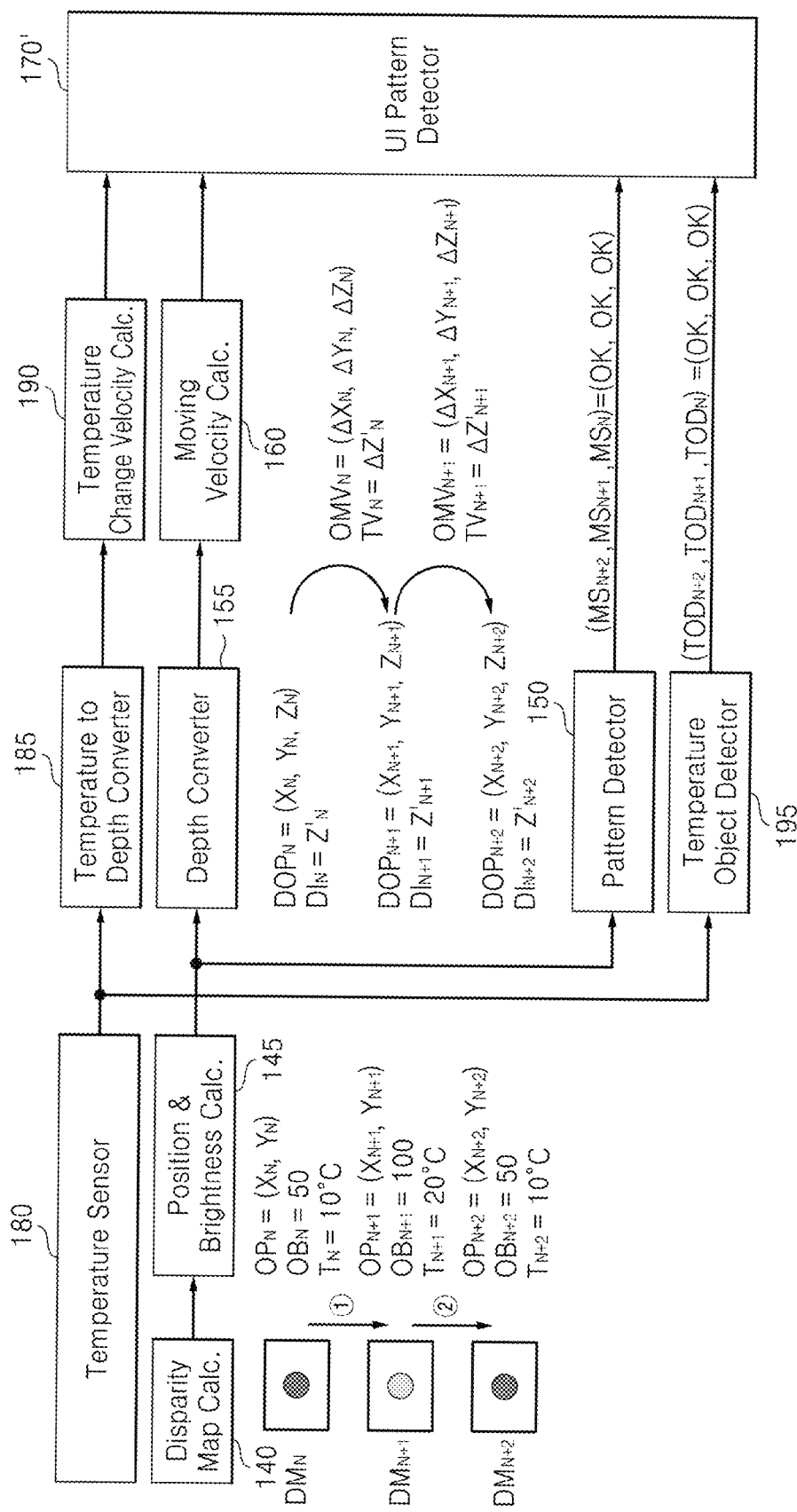
FIG. 11 is a block diagram illustrating an operation of a contactless UI motion recognizing device according to the contactless UI motion illustrated in FIG. 10.

FIG. 10 is a diagram illustrating a contactless UI motion according to an exemplary embodiment. FIG. 11 is a block diagram illustrating an operation of the contactless UI motion recognizing device 100B according to the contactless UI motion in FIG. 10.

According to another exemplary embodiment of a contactless UI motion recognizing device 100B, the contactless UI motion recognizing operation illustrated in FIG. 4 may further include operations of measuring a temperature of a surrounding T, and a DI and an OMV based on the measured temperature T (operations S180-S190 in FIG. 9).

Also, according to another exemplary embodiment of a contactless UI motion recognizing device 100B, the contactless UI motion recognizing process may further include an operation of checking whether there is an object or not based on a temperature of a surrounding T.

As illustrated in FIG. 10, it is assumed that a first motion ① is a motion in which an object 10 moves closer to a camera 110 and a temperature sensor 180 from an original position. Furthermore, a second motion ② is a motion in which the object 10 moves back to its original position. In this case, as illustrated in FIG. 11, the disparity map calculator 140 may calculate the $DM_N$ of an (N)th frame, the $DM_{N+1}$ of an (N+1)th frame, and the $DM_{N+2}$ of an (N+2)th frame and stores the calculated DMs in a memory. It is assumed that $DM_N$ is a DM when the object is in original position before moving, $DM_{N+1}$ is a DM when the object is brought closer to the camera 110 by the first motion ①, and $DM_{N+2}$ is a DM when the object returns to its original position by the second motion ②. The position and brightness calculator 145 senses an end of the object 10 (e.g., a finger) and calculates an OP (operation S145) and an OB corresponding to the OP. For example, the position and brightness calculator 145 may calculate an $OP_N$ ($X_N, Y_N$) and a value $OB_N$=50 corresponding to the $OP_N(X_N, Y_N)$ in the (N)th frame and save the calculated OP and the calculated OB in the memory 135a, calculate an $OP_{N+1}(X_{N+1}, Y_{N+1})$ and a value $OB_{N+1}$=100 corresponding to the $OP_{N+1}$ ($X_{N+1}, Y_{N+1}$) in the (N+1)th frame and save the calculated OP and the calculated OB in the memory 135a, and calculate an $OP_{N+2}$ ($X_{N+2}, Y_{N+2}$) and a value $OB_{N+2}$=50 corresponding to the $OP_{N+2}(X_{N+2}, Y_{N+2})$ in the (N+2)th frame and save the calculated OP and the calculated OB in the memory 135a.

On the other hand, it is assumed that $T_N$ is a temperature when the object is in its original position, $T_{N+1}$ is a temperature when the object is close to the camera 110 due to the first motion ①, and $TN_{N+2}$ is a temperature when the object is far away from the camera 110 due to the second motion ②. It is assumed in the present example that the measured temperatures $T_N$, $TN_{N+1}$, and $TN_{N+2}$ are 10, 20, and 30 degrees Celsius, respectively.

The depth converter 155 may calculate a DI of the object from an OB, and then calculate a DOP of the object based on the DI. For example, the depth converter 155 may convert object brightnesses ($OB_N$, $OB_{N+1}$, $OB_{N+2}$) in each frame to distance information ($Z_N$, $Z_{N+1}$, $Z_{N+2}$) in each frame. Based on the calculated distances ($Z_N$, $Z_{N+1}$, $Z_{N+2}$), three dimensional object positions ($DOP_N$, $DOP_{N+1}$, $DOP_{N+2}$) in each frame can be calculated (operation S155).

The temperature to depth converter 185 may convert measured temperatures ($T_N$, $T_{N+1}$, $T_{N+2}$) in each frame to depth information ($DI_N$, $DI_{N+1}$, $DI_{N+2}$) in each frame (operation S185).

The pattern detector 150 may generate skin-tone matching signals ($MS_N$, $MS_{N+1}$, $MS_{N+2}$) in each frame based on color information of the object ($CI_N$, $CI_{N+1}$, $CI_{N+2}$) in each frame (operation S150). The temperature object detector 195 generates temperature object detection signals ($TOD_N$, $TOD_{N+1}$, $TOD_{N+2}$) in each frame based on measured temperatures ($T_N$, $T_{N+1}$, $T_{N+2}$) in each frame.

The moving velocity calculator 160 may calculate an object moving velocity OMV based on the three dimensional object positions ($DOP_N$, $DOP_{N+1}$, $DOP_{N+2}$) in each frame (operation S160). For example, the moving velocity calculator 160 may calculate an object moving velocity ($OMV_N$, $OMV_{N+1}$) by the exemplary Equation 1.

The temperature change velocity calculator 190 may calculate a temperature-based velocity (TV) by calculating variation of depth information ($DI_N$, $DI_{N+1}$, $DI_{N+2}$) in each frame (operation S190). For example, the temperature change velocity calculator 190 calculates a difference between depth information $DI_{N+1}$ and $DI_N$ ($DI_{N+1}-DI_N$), and calculates a temperature-based velocity ($TV_{N=\Delta}Z'_N$) accordingly. Furthermore, the temperature change velocity calculator 190 calculates a difference between $DI_{N+2}$ and $DI_{N+1}$ ($DI_{N+2}-DI_{N+1}$), and calculates a temperature-based velocity ($TV_{N+1=\Delta}Z'_{N+1}$) accordingly (operation S190).

In another exemplary embodiment, the temperature change velocity calculator 190 may calculate temperature differences between $T_{N+1}$ and $T_N$ ($T_{N+1}-T_N$), and between $T_{N+2}$ and $T_{N+1}$ ($T_{N+2}-T_{N+1}$).

The UI pattern detector 170' may determine a UI pattern of a user based on skin-tone matching signals ($MS_N$, $MS_{N+1}$, $MS_{N+2}$) in each frame, object moving velocities ($OMV_N$, $OMV_{N+1}$), temperature object detection signals ($TOD_N$, $TOD_{N+1}$, $TOD_{N+2}$), and temperature-based velocities ($TV_N$, $TV_{N+1}$) (operation S170').

Once the UI pattern is determined, the operation corresponding to the UI pattern is executed (operation S200). For example, if the UI pattern corresponds to an operation of clicking an icon displayed on a screen where a finger is pointed, the operation corresponding to the icon is executed.

Although the above-described exemplary embodiment determines the UI pattern based on three frames (N, N+1, and N+2), it is understand that one or more other exemplary embodiments are not limited thereto, and the UI pattern may be based on any number of frames. Additionally, while the above-described exemplary embodiment determines that the object corresponds to the finger when all skin-tone matching signals ($MS_N$, $MS_{N+1}$, $MS_{N+2}$) indicate the skin-tone color, it is understood that one or more other exemplary embodiments are not limited thereto, and any predetermined threshold percentage or number of skin-tone matching signals indicating the skin-tone color may be used for the determination.

Figure 12:
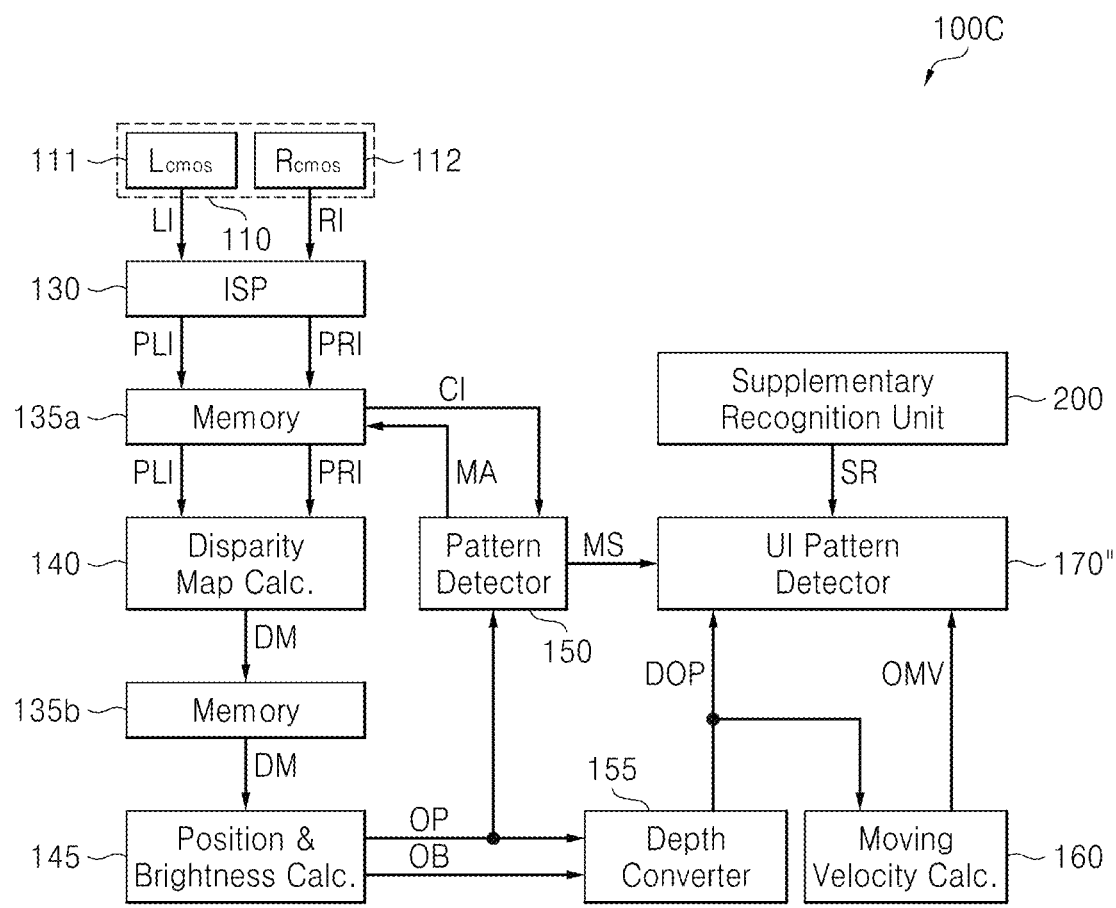
FIG. 12 is a block diagram illustrating a contactless UI motion recognizing device according to still another exemplary embodiment.

FIG. 12 is a block diagram illustrating a contactless UI motion recognizing device 110C according to another exemplary embodiment. Referring to FIG. 12, a contactless UI motion recognizing device 110C has the same or similar structure as that of the contactless UI motion recognizing device 100A illustrated in FIG. 1. Accordingly, differences between the contactless UI motion recognizing device 110C illustrated in FIG. 12 and the contactless UI motion recognizing device 110A illustrated in FIG. 1 will be focused on herein to avoid redundancy. The contactless UI motion recognizing device 100C illustrated in FIG. 12 further includes a supplementary recognition unit 200. The supplementary recognition unit 200 can be a supplementary camera such as a thermal camera or an infrared camera. If the supplementary recognition unit 200 is the infrared camera, the supplementary recognition unit 200 can determine whether an object is present or not, and recognize a shape of the object 10 using infrared light. The supplementary recognition unit 200 can provide its sensing result (SR) to the UI pattern detector 170".

The supplementary unit 200 may also include a gyro sensor, an acceleration sensor, an earth magnetic field sensor, a barometer, a gesture sensor, a proximity sensor, an illuminance sensor, a Red Green Blue (RGB) sensor, a thermal/humidity sensor, or a grip sensor.

The gyro sensor may measure a rotational angular velocity of the object 10 and provide a measured result to the UI pattern decision 170". The acceleration sensor may measure a velocity and a momentum of the object 10. The earth magnetic field sensor may detect an earth's magnetic field. The barometer may measure an altitude. The gesture sensor, the proximity sensor, the illuminance sensor, and the RGB sensor may recognize a motion, an approach, a light source, etc., of the object 10. The thermal/humidity sensor may recognize temperature and humidity of surroundings. The grip sensor may recognize whether a user grabs the contactless UI motion recognizing device 110C or a system including the contactless UI motion recognizing device 110C.

The supplementary recognition unit 200 may include a sensor other than those described above, provide a sensing result (SR) to the UI pattern detector 170". Furthermore, the supplementary recognition unit 200 may also include more than one of the aforementioned cameras and sensors, and may use any of plural cameras and sensors selectively as occasion demands.

Figure 13:
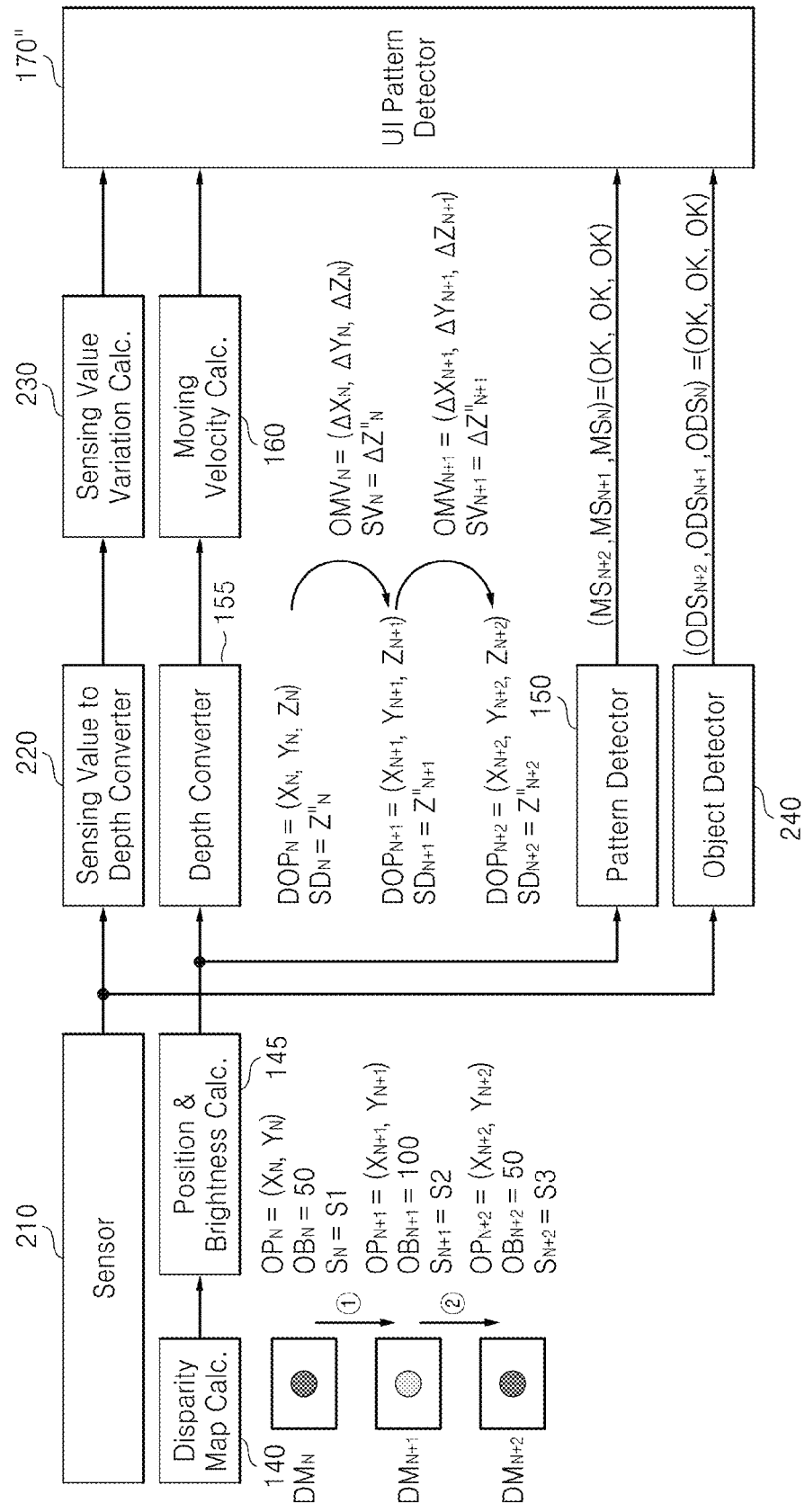
FIG. 13 is a block diagram illustrating an operation of the contactless UI motion recognizing device illustrated in FIG. 12.

FIG. 13 is a block diagram illustrating an operation of the contactless UI motion recognizing device 100C illustrated in FIG. 12 according to an exemplary embodiment. The operation of the contactless UI motion recognizing device 100C illustrated in FIG. 13 is similar to that of the contactless UI motion recognizing device 100C illustrated in FIG. 11, and differences therebetween will be focused on herein to avoid redundancy.

Referring to FIG. 13, a sensor 210 such as the earth magnetic field sensor, the grip sensor, etc., illustrated above can be used with or without the temperature sensor 180. More than one sensor can be used and the thermal camera or the infrared camera also can be used to perform a sensing operation in FIG. 13.

The sensor 210 senses the sensing value ($S_N$), when the object 10 is located in its original location (refer to 10b of FIG. 10), $S_{N+1}$ when the object 10 is brought closer by the first motion ① (refer to 10a of FIG. 10), and $S_{N+2}$ when the object returns to its original location by the second motion ② (refer to 10b in FIG. 10). It is assumed that each sensing value $S_N$, $S_{N+1}$, and $S_{N+2}$ is S1, S2, and S3, respectively.

The sensing value to depth converter 220 may convert sensing values ($S_N$, $S_{N+1}$, and $S_{N+2}$) to depth information ($SD_N$, $SD_{N+1}$, and $SD_{N+2}$).

The sensing value variation calculator 230 may calculate sensing variations ($SV_{N+1}$ and $SV_{N+2}$) based on depth information ($SD_N$, $SD_{N+1}$, and $SD_{N+2}$) that is calculated by the sensing value to depth converter 220. For example, the sensing value variation calculator 230 calculates a sensing variation ($SV_N = {_\Delta}Z''_N$) between depth information $SD_{N+1}$ and $SD_N$ by subtracting $SD_{N+1}$ from $SD_{N+1}$, and calculates a sensing variation ($SV_{N+1} = {_\Delta}Z''_{N+1}$) between depth information $SD_{N+2}$ and $SD_{N+1}$ by subtracting $SD_{N+1}$ from $SD_{N+2}$.

According to an aspect of an exemplary embodiment, the sensing value variation calculator 230 may calculate sensing variations ($SV_N$ and $SV_{N+1}$) based on sensing values ($S_N$, $S_{N+1}$, and $S_{N+2}$). For example, the sensing value variation calculator 230 calculates the sensing variation $SV_N$ between depth information $S_{N+1}$ and depth information $S_N$ by subtracting $S_{N+1}$ from $S_{N+1}$, and calculates sensing variation $SV_{N+1}$ between depth information $S_{N+2}$ and $S_{N+1}$ by subtracting $S_{N+1}$ from $S_{N+2}$.

On the other hand, an object detector 240 may generate object detection signals ($ODS_N$, $ODS_{N+1}$, and $ODS_{N+2}$) based on sensing values ($S_N$, $S_{N+1}$, and $S_{N+2}$). Namely, the object detector 240 may recognize if there is an object (e.g., a finger) based on sensing value S. According to one or more other exemplary embodiments, the object detector 240 may be omitted.

A UI pattern detector 170" may determine a UI pattern of a user based on matching signals ($MS_N$, $MS_{N+1}$, $MS_{N+2}$), velocity information ($OMV_N$ and $OMV_{N+1}$), object detection signals ($ODS_N$, $ODS_{N+1}$, and $ODS_{N+2}$), and sensing variations ($SV_N$ and $SV_{N+1}$).

The sensor 210, the sensing value to depth converter 220, the sensing value variation calculator 230, and the object detector 240 can be components of the supplementary recognition unit 200 in FIG. 12.

Although the above-described exemplary embodiment determines the UI pattern based on three frames (N, N+1, and N+2), it is understand that one or more other exemplary embodiments are not limited thereto, and the UI pattern may be based on any number of frames.

Figure 14:
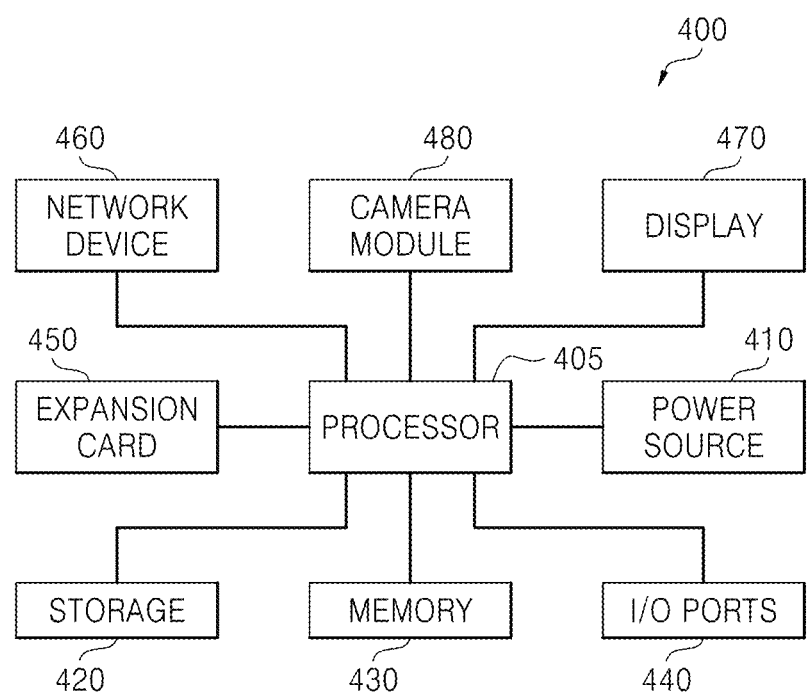
FIG. 14 is a system block diagram illustrating a contactless UI motion recognizing device according to an exemplary embodiment.

FIG. 14 is a system block diagram illustrating a contactless UI motion recognizing device according to an exemplary embodiment. A system 400 can be a personal computer or a data server. The system 400 also can be a portable device such as a mobile phone, a smart phone, a tablet personal computer, a personal digital assistant, an enterprise digital assistant, a digital still camera, a digital video camera, a portable multimedia player, a personal navigation device, a portable navigation device, a handheld game console, an e-book, etc.

The system 400 may include a processor 405, a power source 410, a storage 420, a memory 430, an input/output I/O port 440, an expansion card 450, a network device 460, a display 470, and a camera module 480. Depending on an exemplary embodiment, the system 400 may further include at least one of the image signal processor 130 and the temperature sensor 180.

The processor 405 may control at least one of the aforementioned elements 410-480. Depending on an exemplary embodiment, the processor 405 can implement the disparity map calculator 140, the position and brightness calculator 145, the depth converter 155, the pattern detector 150, the moving velocity calculator 160, and the UI pattern detector 170. Depending on an exemplary embodiment, the processor 405 can further implement the temperature to depth converter 185, the temperature object detector 195, and the temperature change velocity calculator 190.

The power source 410 may supply power to at least one of the aforementioned elements of 410-480. The storage 420 can be a non-volatile storage device, such as a hard disk drive, a solid state drive, etc. The memory 430 may be a non-volatile memory or a volatile memory and may also be the memory 135a/135b illustrated in FIG. 2 or FIG. 8. Depending on an exemplary embodiment, a memory controller can be incorporated in the processor 405 and the memory controller may control a data access operation such as read/write/erase of data. The memory controller can be located between the processor 405 and the memory 430.

The I/O port 440 is a port that can receive data for the system 400 or send data from the system 400 to an external device. For example, the I/O port 440 can be a port for connecting a computer mouse, a printer, a USB drive, etc., to the system 400.

The expansion card 450 can be a secure digital card or multimedia card. For example, the expansion card 450 can be a Subscriber Identification Module (SIM), a Universal Subscriber Identification Module (USIM), etc.

The network device 460 may connect the system 400 to a wireless or wired network. The display 470 may display data supplied from the storage 420, the memory 430, the I/O port 440, the expansion card 450, or the network device 460. The camera module 480 may convert an optical image to an electrical image. Accordingly, the image converted by the camera module 480 can be stored in the storage 420, the memory 430, or the expansion card. Furthermore, the camera module 480 can be the stereo camera 110.

One or more exemplary embodiments can be realized by a computer readable code in a computer readable media. The computer readable media include all media that can be readable by a computer system such as a ROM, a RAM, a CD-ROM, a magnetic tape, a floppy disk, or optical data storage.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of controlling a contactless user-interface (UI) motion recognizing device, the method comprising:
obtaining a left-eye image and a right-eye image;
determining an object position of an object in the obtained left-eye image and the obtained right-eye image;
determining an object brightness of the object;
determining depth information of the object using the determined object brightness;
determining a three-dimensional (3D) object position of the object using the determined object position and the determined depth information;
determining an object moving velocity based on the determined 3D object position and a previous 3D object position; and
determining a UI pattern based on the determined 3D object position and the determined object moving velocity, and executing an operation according to the determined UI pattern,
wherein the method further comprises calculating a disparity between the obtained left-eye image and the obtained right-eye image, and
wherein the determining the object brightness comprises determining the object brightness based on the calculated disparity.

2. The method according to claim 1, further comprising:
converting the calculated disparity to brightness information; and
creating a disparity map based on the brightness information,
wherein the determining the object brightness based on the calculated disparity comprises determining the object brightness based on the created disparity map.

3. The method according to claim 2, wherein the determining the object brightness based on the created disparity map comprises determining the object brightness corresponding to a brightest portion of the disparity map.

4. The method according to claim 2, wherein the determining the object position comprises determining the object position corresponding to a position of a brightest portion of the disparity map.

5. The method according to claim 1, wherein the determining the UI pattern comprises determining whether the determined object moving velocity is greater than a predetermined threshold, and executing the operation in response to determining that the determined object moving velocity is greater than the predetermined threshold.

6. The method according to claim 1, wherein the determining the object moving velocity comprises determining the object moving velocity according to:

$$OMV=(X_{N+1}-X_N, Y_{N+1}-Y_N, Z_{N+1}-Z_N),$$

where OMV is the object moving velocity, $X_{N+1}$ is a first dimension coordinate of the determined 3D object position, $Y_{N+1}$ is a second dimension coordinate of the determined 3D object position, $Z_{N+1}$ is a third dimension coordinate of the determined 3D object position, $X_N$ is a first dimension coordinate of the previous 3D object position, $Y_N$ is a second dimension coordinate of the previous 3D object position, and $Z_N$ is a third dimension coordinate of the previous 3D object position.

7. The method according to claim 1, further comprising:
determining whether the object is a pre-defined object,
wherein the UI pattern is determined based on the determined 3D object position, the determined object moving velocity, and whether the object is determined as the pre-defined object.

8. The method according to claim 7, wherein the determining whether the object is the pre-defined object comprises determining whether a color of the object is a pre-defined color according to color information corresponding to a pixel group of the determined object position.

9. The method according to claim 1, wherein the left-eye image and the right-eye image are obtained using a stereo camera of the contactless UI motion recognizing device.

10. The method according to claim 1, wherein the determining the object position comprises sensing an end of the object and determining an object position of the sensed end of the object.

11. The method according to claim 10, wherein a brightest portion of the obtained left-eye image and the obtained right-eye image is sensed as the end of the object.

12. The method according to claim 1, further comprising:
measuring a temperature of a surrounding; and
detecting the object based on the measured temperature and obtaining a temperature object detection signal according to the detecting,
wherein UI pattern is determined based on the determined 3D object position, the determined object moving velocity, and the obtained temperature object detection signal.

13. The method according to claim 12, further comprising:
converting the measured temperature to temperature-based depth information,
wherein the UI pattern is determined based on the determined 3D object position, the determined object moving velocity, the obtained temperature object detection signal, and the temperature-based depth information.

14. The method according to claim 1, further comprising:
sensing a sensing value of the object using a sensor;
detecting the object based on the sensed sensing value and obtaining a sensor object detection signal according to the detecting,
wherein UI pattern is determined based on the determined 3D object position, the determined object moving velocity, and the obtained sensor object detection signal, and
wherein the sensor comprises at least one of an infrared camera, a thermal sensor, a gyro sensor, an acceleration sensor, an earth magnetic field sensor, a barometer, a gesture sensor, a proximity sensor, an illuminance sensor, a Red Green Blue (RGB) sensor, a thermal/humidity sensor, and a grip sensor.

15. A method of controlling a contactless user-interface (UI) motion recognizing device, the method comprising:
obtaining a left-eye image and a right-eye image;
determining an object position of an object in the obtained left-eye image and the obtained right-eye image;
determining an object brightness of the object;
determining depth information of the object using the determined object brightness;
determining a three-dimensional (3D) object position of the object using the determined object position and the determined depth information;
determining an object moving velocity based on the determined 3D object position and a previous 3D object position; and
determining a UI pattern based on the determined 3D object position and the determined object moving velocity, and executing an operation according to the determined UI pattern,
wherein the method further comprises:
sensing a sensing value of the object using a sensor;
detecting the object based on the sensed sensing value and obtaining a sensor object detection signal according to the detecting; and
determining variations of the sensing value over time,
wherein the UI pattern is determined based on the determined 3D object position, the determined object moving velocity, the obtained sensor object detection signal, and the determined variations of the sensing value, and
wherein the sensor comprises at least one of an infrared camera, a thermal sensor, a gyro sensor, an acceleration sensor, an earth magnetic field sensor, a barometer, a gesture sensor, a proximity sensor, an illuminance sensor, a Red Green Blue (RGB) sensor, a thermal/humidity sensor, and a grip sensor.

16. A method of controlling a contactless user-interface (UI) motion recognizing device, the method comprising:
obtaining a left-eye image and a right-eye image;
determining an object position of an object in the obtained left-eye image and the obtained right-eye image;
determining an object brightness of the object;
determining depth information of the object using the determined object brightness;
determining a three-dimensional (3D) object position of the object using the determined object position and the determined depth information; and
determining a UI pattern based on the determined 3D object position and executing an operation according to the determined UI pattern,
wherein the method further comprises calculating a disparity between the obtained left-eye image and the obtained right-eye image;
wherein the determining the object brightness comprises determining the object brightness based on the calculated disparity.

17. The method according to claim 16, further comprising:
converting the calculated disparity to brightness information; and
creating a disparity map based on the brightness information,
wherein the determining the object brightness based on the calculated disparity comprises determining the object brightness based on the created disparity map.

18. The method according to claim 17, wherein the determining the object brightness based on the created disparity map comprises determining the object brightness corresponding to a brightest portion of the disparity map.

19. The method according to claim 17, wherein the determining the object position comprises determining the object position corresponding to a position of a brightest portion of the disparity map.

* * * * *